Jan. 13, 1970         D. E. LIPFERT         3,489,829
PROCESS OF MAKING AND ATTACHING SNAP FASTENER PARTS
Filed May 2, 1966
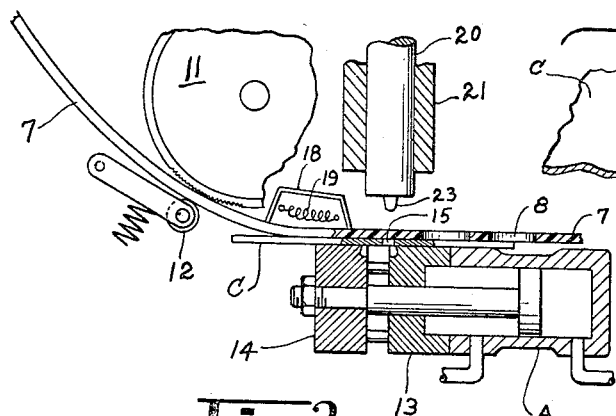
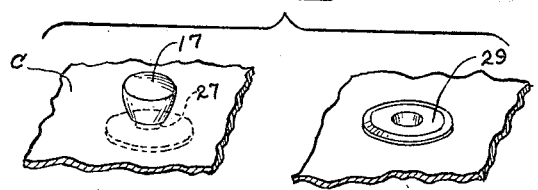
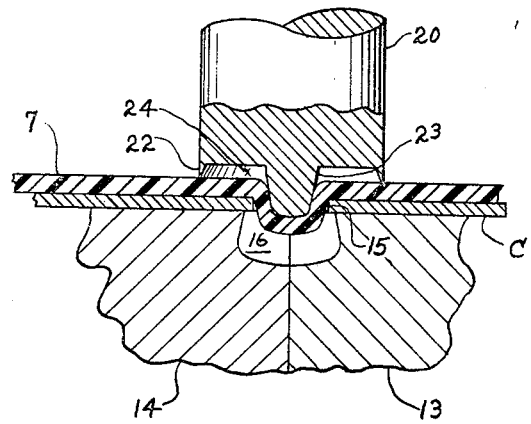
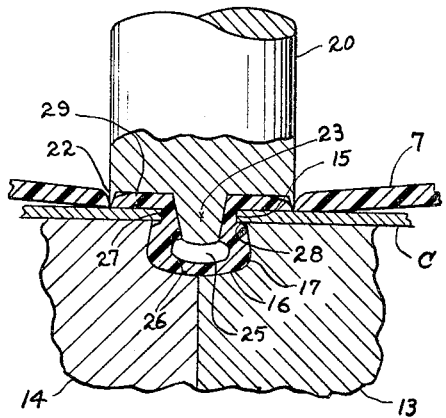
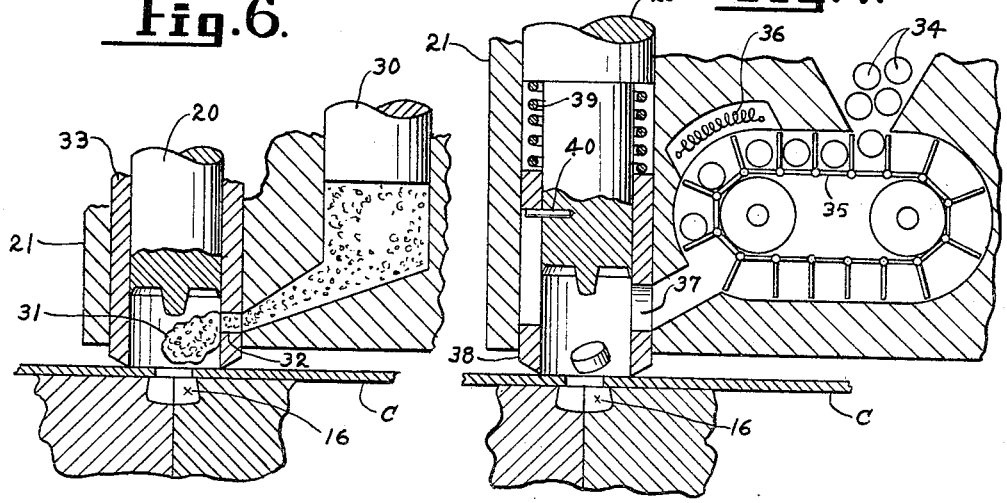

United States Patent Office 3,489,829
Patented Jan. 13, 1970

3,489,829
PROCESS OF MAKING AND ATTACHING SNAP FASTENER PARTS
Donald E. Lipfert, Woolwich, Maine, assignor to Scovill Manufacturing Company, Waterbury, Conn., a corporation of Connecticut
Filed Nov. 2, 1966, Ser. No. 591,643
Int. Cl. B29d *31/00;* B29h *9/02;* B29c *17/08;* B32b *31/20*
U.S. Cl. 264—93   2 Claims

ABSTRACT OF THE DISCLOSURE

A process of making the stud element of a snap fastener and simultaneously attaching it mechanically to an article involves the formation of a piece of plastic material with a base on one side of the article and a stud on the other side, the stud being formed in a die cavity which has an entrance opening larger than a preformed hole in the article so as to form a neck which fits tightly in the opening of the article and is held by a shoulder on the inner side of the stud head.

---

This invention relates to snap fasteners and particularly to the simultaneous manufacture and securement of the fastener parts to an article to be fastened. It is particularly adaptable to flat-surfaced articles, such as portions of paper or cardboard cartons.

I am aware that it has been proposed in the formation of some old glove fasteners to apply endwise pressure to a stud head after it was inserted in an article, which operation caused the stud to be interlocked with a washer. This is illustrated in the Richardson Patent 412,668, dated Oct. 8, 1889. However, there still remained the need for a very inexpensive method of making and applying fastener parts from plastic material to such articles as cardboard cartons, and it is the general object of this invention to fulfill that need.

According to the present invention, it is merely necessary to provide a pre-pierced piece of cardboard or the like, place it against a head-forming die, feed a mass of plastic material into place and apply pressure on the plastic material while tightly confining it in a space surrounding said aperture so as to flow the material into the die, thus forming a neck tightly fitting around the aperture and also forming a flat base bearing against the outer surface of the piece of cardboard.

With this single operation, therefore, it is possible to form the stud element of a snap fastener as one piece in situ on the carton while the carton is being manufactured, and at very little additional cost. All pre-forming steps are eliminated with the sole exception of a prepierced opening in the cardboard material and a single operation produces the finished article ready for use. For cardboard cartons, the socket element which cooperates with the stud can be simply a hole pierced in the carton material.

Other objects and advantages of the invention will hereinafter more fully appear.

In the accompanying drawing, I have shown for purposes of illustration, three embodiments which the invention may assume in practice. In the drawing:

FIG. 1 is a diagrammatic view of one form of apparatus for carrying out my improved process;

FIG. 2 is a fragmentary cross-section showing an intermediate phase of the process;

FIG. 3 is similar to FIG. 2 showing the final stage of forming the fastener;

FIG. 4 shows top and bottom perspective views of the stud element molded to a cardboard support;

FIG. 5 is a perspective view of a portion of the strip employed in the process; and FIGS. 6 and 7 show portions of apparatus employed in modified processes.

The plastic material as used in the process indicated in FIGS. 1–2–3 is a flat narrow strip 7, of which one example may be polystyrene. In FIG. 5, the holes 8 indicate places from which discs have been punched for forming the fastener elements. In order to assist in feeding the strip while in somewhat softened condition, some longitudinally extending reinforcement may be provided, such as the metal foil strips 9 and 10 folded around the edges of the strip. The strip 7 may be fed stepwise by means of a knurled feeding wheel 11 against which it is held by a spring-pressed roller 12.

The cardboard strip C or portion of a carton is placed over the top face of a split-forming die having two parts—a stationary part 13 and a movable part 14, which are shown in open position in FIG. 1 and in closed position in FIGS. 2–3. The movable part 14 may be operated by a suitable rod and piston actuated in a conventional double-acting air cylinder A. The cardboard piece C will have been provided with a preformed aperture 15 which will be aligned with the die cavity 16 when the die parts are closed.

The entrance portion of the die cavity 16 has a diameter slightly larger than the aperture 15 in the cardboard and the walls of the die cavity taper outwardly from the entrance cavity so as to form the desired shape of bulbous head 17 of the fastener element.

As the strip 7 is fed into position over the die, it is pre-heated by any suitable means, such as the enclosure 18 which may contain an electric resistance coil 19. The forming punch 20 is mounted for up-and-down movement in a suitable guide 21 and may be actuated in properly timed relation by any suitable means, such as an air cylinder (not illustrated). The punch has a circular depending rim 22 with a relatively sharp edge to engage the strip 7 and punch a circular disc out of the strip.

The bottom end of the punch also has a central projection 23 which is considerably smaller than the die cavity 16. The projection 23 engages the strip 7 just prior to the cutting edge of the rim 22 so as to force some of the strip material through the aperture 15 in the cardboard and into the die cavity 16. This position is indicated in FIG. 2. At that point, air will be trapped in the annular space 24 between the rim 22 and projection 23. Further downward movement of the punch 20 will compress that air trapped within the space 24 and extrude the plastic material around the projection 23 so as substantially to fill the die cavity 16. The trapped air ends up in the space 25 so as to form the stud head hollow but with relatively thick sidewalls and a comparatively thin endwall 26.

The aperture 15 in the cardboard actually serves to confine the neck 27, resulting in a narrow shoulder 28 which mechanically locks the stud in place. The circular base flange 29 of the stud element which bears against the cardboard material on the opposite side thereof from the stud head 17, will be somewhat thinner than the original strip 7 due to the extrusion of material into the die cavity 16. After the stud is completely formed into the state as shown in FIG. 3, the die parts 13 and 14 will be opened to the position of FIG. 1 whereupon the cardboard strip C with the completely assembled stud, as best seen in FIG. 4, may be removed from the machine and the process repeated.

In FIG. 6, I have indicated a modification wherein the material may be fed in plastic or fluent form by means of a metering plunger 30 adapted to push a measured quantity of plastic material 31 through the aperture 32 when the sleeve 33 is moved against the carton strip C. The punch 20 may be of the same construction as in FIGS. 2-3, and when it moves to close the aperture 32, air will be trapped and the plastic material extruded into the die cavity 16 to form the desired shape of fastener as indicated in FIG. 3.

FIG. 7 illustrates still another modification where the plastic material is provided in the form of pellets 34 fed by suitable conveyor 35 and heated by any suitable means, such as indicated at 36. From the conveyor, the pellets drop one by one through an opening 37 in sleeve 38 which may have a lost-motion connection with the punch 20 by means of spring 39 and pin 40. After the punch closes off the opening 37, the pellet will be trapped along with a quantity of air and formed in the die cavity 16 to the same shape as shown in FIG. 3.

What I claim is:

1. The process of simultaneously making the stud element of a snap fastener and mechanically attaching it to a flat-surfaced article to be fastened, comprising
    (a) placing the inner surface of said article against the face of a head-forming die with a preformed aperture in the article aligned with the die cavity, said die cavity opening through said face and registering with said aperture in the article wherein the entrance portion of said cavity has a diameter slightly greater than said aperture;
    (b) feeding a mass of pressure formable plastic material onto the outer surface of said article;
    (c) applying pressure on said material while tightly confining it in a space surrounding said aperture to form a base flange bearing against said outer surface of the article while forcing material through said aperture into said die to form the stud head with a neck tightly fitting in said aperture;

further characterized by the application of pressure on the plastic material by a punch with a depending outer rim whereby air is entrapped when the rim engages the plastic material, said air being further compressed by the punch to force plastic material into said die cavity.

2. The process defined in claim 1 wherein the punch which applies pressure to the plastic material has a central projection in alignment with said aperture and die, said projection being smaller than said die cavity, and wherein plastic material is extruded around said projection while the air is being further compressed to form a hollow stud head in said die.

References Cited

UNITED STATES PATENTS

| | | | |
|---|---|---|---|
| 1,784,780 | 12/1930 | Bronson | 260—249 |
| 3,280,238 | 10/1966 | Calvert | 264—163 |

ROBERT F. WHITE, Primary Examiner

R. SHEAR, Assistant Examiner

U.S. Cl. X.R.

264—163, 249, 267, 273, 275, 279